US012802970B2

(12) United States Patent
Yin et al.

(10) Patent No.: US 12,802,970 B2
(45) Date of Patent: Nov. 17, 2026

(54) NEGATIVE ELECTRODE MATERIAL ON WHICH METAL ELEMENT IS GRADIENT-DOPED AND APPLICATION THEREOF

(71) Applicant: Tianmulake Excellent Anode Materials Co, Ltd., Liyang (CN)

(72) Inventors: Yingying Yin, Liyang (CN); Bonan Liu, Liyang (CN); Fei Luo, Liyang (CN); Hong Li, Liyang (CN)

(73) Assignee: Tianmulake Excellent Anode Materials Co., Ltd., Liyang (CN)

( * ) Notice: Subject to any disclaimer, the term of this patent is extended or adjusted under 35 U.S.C. 154(b) by 632 days.

(21) Appl. No.: 18/246,727

(22) PCT Filed: Mar. 2, 2021

(86) PCT No.: PCT/CN2021/078604
§ 371 (c)(1),
(2) Date: Mar. 27, 2023

(87) PCT Pub. No.: WO2022/062320
PCT Pub. Date: Mar. 31, 2022

(65) Prior Publication Data

US 2023/0369572 A1 Nov. 16, 2023

(30) Foreign Application Priority Data

Sep. 27, 2020 (CN) ......................... 202011031911.2

(51) Int. Cl.
*H01M 4/36* (2006.01)
*C01B 33/113* (2006.01)
(Continued)

(52) U.S. Cl.
CPC ........... *H01M 4/366* (2013.01); *C01B 33/113* (2013.01); *H01M 4/133* (2013.01); *H01M 4/134* (2013.01);
(Continued)

(58) Field of Classification Search
CPC ...... H01M 4/366; H01M 4/133; H01M 4/134; H01M 4/386; H01M 4/587; H01M 10/052;
(Continued)

(56) References Cited

U.S. PATENT DOCUMENTS

2010/0243951 A1* 9/2010 Watanabe ............. H01M 4/485
252/182.1
2021/0167362 A1 6/2021 Park et al.
(Continued)

FOREIGN PATENT DOCUMENTS

CN 108461723 A 8/2018
CN 109755500 A 5/2019
(Continued)

OTHER PUBLICATIONS

Machine translation of CN110556529A (Sep. 22, 2025) (Year: 2025).*
(Continued)

*Primary Examiner* — Matthew J Merkling
(74) *Attorney, Agent, or Firm* — TraskBritt

(57) ABSTRACT

A negative electrode material on which a metal element is gradient-doped and an application thereof. The negative electrode material comprises a granular silica/M composite material on which a metal element M is gradient-doped. The general formula of the silica is $SiO_x$, wherein $0<x<2$. The metal element M comprises one or more among Na, Mg, Al, Li, Mn, Fe, Co, Ni, Cu, or Zn. In the negative electrode material, the content of the metal element M gradually
(Continued)

decreases from the surface to the core, presenting a doping distribution having a continuous concentration gradient. The general chemical formula of the silica/M composite material is $SiM_yO_z$, wherein 0<y<10 and 0<z<10.

6 Claims, 1 Drawing Sheet

(51) Int. Cl.

| | |
|---|---|
| ***H01M 4/02*** | (2006.01) |
| ***H01M 4/133*** | (2010.01) |
| ***H01M 4/134*** | (2010.01) |
| ***H01M 4/38*** | (2006.01) |
| ***H01M 4/587*** | (2010.01) |
| ***H01M 10/052*** | (2010.01) |
| ***H01M 10/0525*** | (2010.01) |

(52) U.S. Cl.
CPC ........... *H01M 4/386* (2013.01); *H01M 4/587* (2013.01); *H01M 10/052* (2013.01); *H01M 10/0525* (2013.01); *C01P 2004/03* (2013.01); *C01P 2006/40* (2013.01); *H01M 2004/021* (2013.01); *H01M 2004/027* (2013.01)

(58) Field of Classification Search
CPC ....... H01M 10/0525; H01M 2004/021; H01M 2004/027; C01B 33/113; C01P 2004/03; C01P 2006/40
See application file for complete search history.

(56) References Cited

U.S. PATENT DOCUMENTS

| | | | | |
|---|---|---|---|---|
| 2022/0328813 | A1 * | 10/2022 | Wu | H01M 4/5825 |
| 2024/0105924 | A1 | 3/2024 | Wu et al. | |

FOREIGN PATENT DOCUMENTS

| | | | | |
|---|---|---|---|---|
| CN | 110556529 | A | 12/2019 | |
| CN | 111164803 | A | 5/2020 | |
| CN | 111180692 | A | 5/2020 | |
| CN | 111342031 | A | 6/2020 | |
| CN | 112271277 | A | 6/2021 | |
| EP | 3379611 | B1 * | 11/2020 | H01M 4/583 |
| EP | 3879605 | A1 | 9/2021 | |
| KR | 10-2010-0007806 | A | 1/2010 | |
| WO | 2020/040586 | A1 | 2/2020 | |
| WO | WO-2020103914 | A1 * | 5/2020 | H01M 10/46 |

OTHER PUBLICATIONS

Machine Translation of WO-2020103914-A1 (Apr. 14, 2026) (Year: 2026).*
Chinese Office Action and Search Report for Application No. 202011031911.2 dated Jan. 7, 2022, 6 pages.
International Search Report for Application No. PCT/CN2021/078604 mailed Apr. 27, 2021, 2 pages.
International Written Opinion for Application No. PCT/CN2021/078604 mailed Apr. 27, 2021, 4 pages.
European Search Report and Opinion for Application No. 21870709.9 dated Jul. 2, 2025, 10 pages.

* cited by examiner

NEGATIVE ELECTRODE MATERIAL ON WHICH METAL ELEMENT IS GRADIENT-DOPED AND APPLICATION THEREOF

CROSS-REFERENCE TO RELATED APPLICATIONS

This application is a national phase entry under 35 U.S.C. § 371 of International Patent Application PCT/CN2021/078604, filed Mar. 2, 2021, designating the United States of America and published as International Patent Publication WO 2022/062320 A1 on Mar. 31, 2022, which claims the benefit under Article 8 of the Patent Cooperation Treaty to Chinese Patent Application Serial No. 202011031911.2, filed Sep. 27, 2020.

TECHNICAL FIELD

The disclosure relates to the technical field of secondary battery materials, in particular, to a negative electrode material on which a metal element is gradient-doped and application thereof.

BACKGROUND

With the application of lithium ion batteries in the power field, the demand of people for the performance of secondary batteries is increasing day by day. In order to improve energy density, developing positive and negative electrode active materials with higher capacity has become the main research direction. At present, the high-energy density negative electrode material mainly developed commercially is Silicon-based negative electrode. In theory, the silicon negative electrode shows an ultra-high capacity of 4200 mAh/g, but the process of lithium deintercalation is accompanied by about 300% volume expansion, which brings big problems for its practical application. $SiO_x$ has smaller capacity than silicon, but it has obvious advantages in relieving volume expansion and prolonging the cycle life of batteries. However, during first-cycle lithium intercalation of $SiO_x$, lithium reacts with silicon dioxide to form an irreversible lithium oxide, which leads to the loss of lithium, and first-cycle charge and discharge efficiency drops below 75%. In addition, although smaller than that of silicon, the volume expansion of $SiO_x$ is also obvious.

In order to improve the first efficiency of $SiO_x$ and slow down the volume expansion, pre-lithiation or doping other elements is commonly conducted. However, the specific implementation of pre-lithiation and doping and the selection of materials correspond to different improvement effects. Up to now, poor cycling performance is still the main reason that restricts the industrialization of $SiO_x$. At present, the main problem to be solved is to improve the first efficiency of $SiO_x$ and alleviate the volume expansion before and after lithium intercalation and deintercalation.

BRIEF SUMMARY

The embodiments of the disclosure provide a negative electrode material on which a metal element is gradient-doped and application thereof. The negative electrode material contains a metal element M doped in a concentration-gradient manner, which can improve the cycling performance of $SiO_x$. The gradient doping featured by gradually increasing concentration from inside to outside provides a space for the expansion of $SiO_x$ particles, so as to realize slow pressure release, thus slowing down the accumulation of stress, and helping to alleviate the negative impact of volume expansion and improve the cycling performance of materials.

In a first aspect, an embodiment of the disclosure provides a negative electrode material on which a metal element is gradient-doped, wherein the negative electrode material comprises a granular silicon oxide/M composite material on which a metal element M is gradient-doped;

the general formula of the silicon oxide is $SiO_x$, wherein $0<x<2$;

the metal element M comprises one or more of Na, Mg, Al, Li, Mn, Fe, Co, Ni, Cu or Zn; in the negative electrode material, the content of the metal element M gradually decreases from a surface to a core, showing a continuous doping distribution of concentration gradient; and the general chemical formula of the silicon oxide/M composite material is $SiM_yO_z$, wherein $0<y<10$, $0<z<10$.

Preferably, the average doping mass of the metal element M in the negative electrode material accounts for 5-40% of the total mass of the negative electrode material;

wherein the content of the metal element M decreases continuously from 30-50% on the surface to 0-20% at the core in a gradient manner.

Further, preferably, a doping region of the metal element M is a region that occupies [0-20%] to 100% of the particle radius of the negative electrode material from inside to outside.

Preferably, an average particle diameter ($D_{50}$) of the negative electrode material is 0.1-40 μm, and a particle specific surface area of the negative electrode material is 1-40 $m^2/g$.

Preferably, the negative electrode material further comprises a carbonaceous coating layer coated on outer surfaces of the silicon oxide/M composite particles.

In a second aspect, an embodiment of the disclosure provides a negative electrode plate comprising the negative electrode material described in the first aspect.

In a third aspect, an embodiment of the disclosure provides a lithium battery comprising the negative electrode material described in the first aspect.

The negative electrode material on which a metal element is gradient-doped provided by the embodiments of the disclosure is a composite material particle containing a main part $SiO_x$ and a doped metal element M, the content of M gradually decreases from the surface to the core of the particle, and a continuous doping distribution of concentration-gradient is shown. This concentration-gradient doping method can improve the cycling performance of $SiO_x$. Volume expansion of the $SiO_x$ particles occurs during lithium intercalation, and an outer layer of the particle bears not only the stress caused by its own volume expansion, but also the pressure caused by volume expansion inside the particle, so the outer layer of the particle has more severe volume deformation than an inner layer. A compound formed by the doped metal element M and $SiO_x$ can relieve the volume expansion. The gradient doping method featured by gradually increasing concentration of M from inside to outside provides a space for the expansion of $SiO_x$ particles, so as to realize slow pressure release, thus slowing down the accumulation of stress, and helping to alleviate the negative impact of volume expansion and improve the cycling performance of materials.

BRIEF DESCRIPTION OF THE DRAWINGS

The technical solution of the embodiments of the disclosure will be described in further detail with reference to the drawings and embodiments.

DETAILED DESCRIPTION

Figure 1:
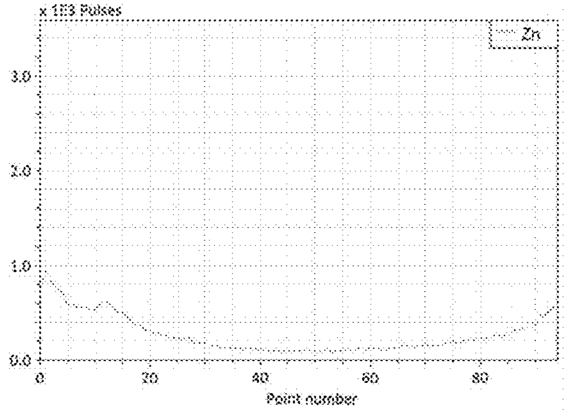
FIG. 1 is a test chart of the distribution curve of Zn content along the cross-sectional diameter of a negative electrode material on which a metal element is gradient-doped provided by an embodiment of the disclosure.

The present invention will be further explained below with reference to drawings and specific embodiments, but it should be understood that these embodiments are only for more detailed explanation, and should not be construed as limiting the disclosure in any way, that is, not intended to limit the scope of protection of the disclosure.

A negative electrode material on which a metal element is gradient-doped according to the disclosure comprises a granular silicon oxide/M composite material on which a metal element M is gradient-doped;

Wherein, the general formula of the silicon oxide is $SiO_x$, where $0<x<2$; the metal element M comprises one or more of Na, Mg, Al, Li, Mn, Fe, Co, Ni, Cu or Zn; in the negative electrode material, the content of the metal element M gradually decreases from a surface to a core, showing a continuous doping distribution of concentration gradient; and The general chemical formula of the silicon oxide/M composite material is $SiM_yO_z$, where $0<y<10$, $0<z<10$.

The average particle diameter ($D_{50}$) of the negative electrode material is 0.1-40 μm, and the particle specific surface area of the negative electrode material is 1-40 $m^2/g$.

The negative electrode material may further comprise a carbonaceous coating layer coated on outer surfaces of silicon oxide/M composite particles.

Further, the average doping mass of the metal element M in the negative electrode material accounts for 5%-40% of the total mass of the negative electrode material, and the content of the metal element M decreases continuously from 30-50% on the surface to 0-20% at the core in a gradient manner. In the disclosure, a doping region of the metal element M is a region that occupies [0-20%] to 100% of the particle radius of the negative electrode material from inside to outside, for example, the negative electrode material may be completely doped, or 2%, 5%, 10%, 15% or 20% of the core of the negative electrode material may be undoped. The above shows that the doping amount of the metal element M in the core may or may not be zero, and there may be a region without the metal element M in the core.

In different embodiments, an energy dispersion spectrum (EDS) is scanned along the diameter direction of the cross section of the particle, and an M content curve obtained from the EDS shows that from one end surface to the core and then the other end surface, the content of M gradually decreases and then gradually increases. In some examples, there is a plateau area with zero M between decreasing and increasing sections of the curve, while in others, there is no plateau area.

The negative electrode material proposed in this embodiment can be used in negative electrode sheets and lithium ion batteries, such as liquid lithium ion batteries, semi-solid lithium ion batteries, all-solid ion batteries or lithium-sulfur batteries, and can also be combined with other materials to serve as a negative electrode material in practice.

The negative electrode material on which a metal element is gradient-doped provided by the embodiments of the disclosure is a composite material particle containing a main part $SiO_x$ and a doped metal element M, the content of M gradually decreases from the surface to the core of the particle, and a continuous doping distribution of concentration-gradient is shown. This concentration-gradient doping method can improve the cycling performance of $SiO_x$. Volume expansion of the $SiO_x$ particles occurs during lithium intercalation, and an outer layer of the particle bears not only the stress caused by its own volume expansion, but also the pressure caused by volume expansion inside the particle, so the outer layer of the particle has more severe volume deformation than an inner layer. A compound formed by the doped metal element M and $SiO_x$ can relieve the volume expansion. The gradient doping method featured by gradually increasing concentration of M from inside to outside provides a space for the expansion of $SiO_x$ particles, so as to realize slow pressure release, thus slowing down the accumulation of stress, and helping to alleviate the negative impact of volume expansion and improve the cycling performance of materials. Compared with a conventional uniformly doped material, the gradiently doped material structure of the disclosure has a better volume expansion relieving effect and better cycling performance.

For the sake of a better understanding of the technical scheme provided by the disclosure, several specific examples are given below to illustrate negative electrode materials with gradient doping of different metal elements, application methods thereof in lithium ion batteries and battery characteristics.

Embodiment 1

The embodiment provides a negative electrode material on which Zn is gradient doped.

The preparation process and testing process are as follows.

Figure 2:
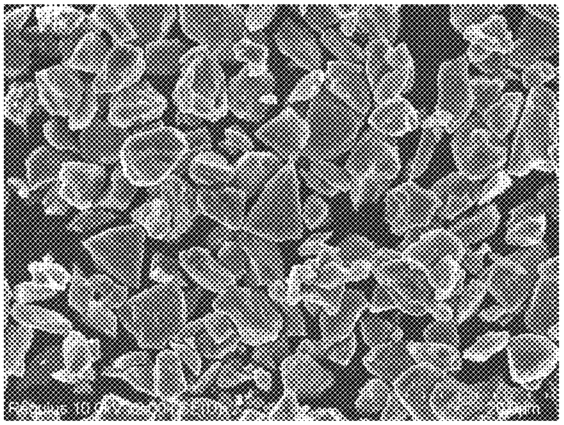
FIG. 2 is a scanning electron microscope (SEM) diagram of a negative electrode material on which a metal element is gradient-doped provided by an embodiment of the disclosure.

(1) A zinc acetate solution of 1 mol/L, a sodium hydroxide solution of 2 mol/L and ammonia water of 2 mol/L were prepared first;

(2) $SiO_x$ particles and deionized water were fully stirred and evenly mixed according to the ratio of 1:10 to prepare $SiO_x$ slurry, then the zinc acetate solution was added while stirring, where the mass ratio of the introduced zinc element to the $SiO_x$ was 1:3, after even mixing, the sodium hydroxide solution and the ammonia water were added into a reaction container together, the pH was adjusted to 11, and continuous stirring was conducted for 10 hours, where the reaction temperature in the whole process was 60° C.;

(3) the precipitated slurry was washed and centrifuged many times, and dried in an oven at 80° C. for 12 hours;

(4) a dried precursor was put into a high-temperature furnace, sintered at 1200° C. for 3 hours in a nitrogen atmosphere, and naturally cooled, crushed and screened to obtain a $SiO_x$ composite material with gradient-doped Zn;

(5) the screened sample was evenly mixed with petroleum asphalt according to the mass ratio of 20:1, and the mixture was placed in a high-temperature furnace to be subjected to heat treatment at 900° C. in a nitrogen atmosphere for 2 hours to obtain a carbon-coated $SiO_x$ composite negative electrode with Zn doped in a concentration-gradient manner;

(6) a prepared $SiO_x$ particle doped with Zn doped in a concentration-gradient manner was cut by a focused ion beam, and energy spectrum analysis was performed under a scanning electron microscope, where the distribution curve of Zn along the diameter of section of the particle is shown in FIG. 1;

Because the doping reaction adopted by the disclosure was a solid-solid reaction, in the slurry state, a doping source first adhered to a surface of the $SiO_x$ particle, and then underwent high-temperature treatment; the doping element gradually diffused into the $SiO_x$ particle under the driving of its own concentration difference; the doping and diffusion processes were closely related to the concentration gradient of the doping source, diffusion time, diffusion temperature, the $SiO_x$ particle size, adhesion strength of the doping source, the particle size of the doping source and other factors, which were the main factors affecting the final doping concentration distribution; and by controlling these variables, different distributions of Zn can be realized;

(7) the scanning electron microscope (SEM) diagram of the prepared $SiO_x$ particle with Zn doped in a concentration-gradient manner is shown in FIG. 2, which is a micron-sized irregular potato shape; and (8) the prepared $SiO_x$ composite material, carbon black (SP) and sodium carboxymethyl cellulose (CMC) were mixed according to the ratio of 7:2:1 to prepare negative electrode slurry, a negative electrode sheet was prepared after coating and drying, metal Li was used as a counter electrode, a button cell was assembled in a glove box, and a charge-discharge test was conducted; and battery test results are listed in Table 1.

Embodiment 2

The embodiment provides a negative electrode material with gradient doped Zn.

The preparation process and testing process are as follows.

(1) An acetone solution of zinc xanthate of 1 mol/L was prepared first;

(2) $SiO_x$ particles and acetone were fully stirred and evenly mixed according to the ratio of 1:10 to prepare $SiO_x$ slurry, then the acetone solution of zinc xanthate was added while stirring, where the mass ratio of the introduced zinc element to the $SiO_x$ was 1:4, continuous stirring was conducted for 10 hours, and then the mixture was placed in an oven at 80° C. to be baked for 12 hours;

(3) a dried precursor was placed in a high-temperature furnace and sintered at 1200° C. for 3 hours in a nitrogen atmosphere, and naturally cooled, crushed and screened to obtain a $SiO_x$ composite material with gradient doped of Zn;

(4) the screened sample was evenly mixed with petroleum asphalt according to the mass ratio of 20:1, and the mixture was placed in a high-temperature furnace to be subjected to heat treatment at 900° C. in a nitrogen atmosphere for 2 hours to obtain a carbon-coated $SiO_x$ composite negative electrode with Zn doped in a concentration-gradient manner;

(5) the prepared $SiO_x$ composite material, carbon black (SP) and sodium carboxymethyl cellulose (CMC) were mixed according to the ratio of 7:2:1 to prepare negative electrode slurry, a negative electrode sheet was prepared after coating and drying, a ternary positive electrode material, Lithium nickel cobalt manganate NCM 811, was used as a counter electrode, a button cell was assembled in a glove box, and a charge-discharge test was conducted; and battery test results are listed in Table 1.

Embodiment 3

The embodiment provides a negative electrode material with gradient-doped of Zn.

The preparation process and testing process are as follows.

(1) A zinc acetate solution of 1 mol/L, a sodium hydroxide solution of 2 mol/L and ammonia water of 2 mol/L were prepared first;

(2) $SiO_x$ particles and deionized water were fully stirred and evenly mixed according to the ratio of 1:10 to prepare $SiO_x$ slurry, then the zinc acetate solution was added while stirring, where the mass ratio of the introduced zinc element to the $SiO_x$ was 1:5, after even mixing, the sodium hydroxide solution and the ammonia water were added into a reaction container together, the pH was adjusted to 11, and continuous stirring was conducted for 10 hours, where the reaction temperature in the whole process was 60° C.;

(3) the precipitated slurry was washed and centrifuged many times, and dried in an oven at 80° C. for 12 hours;

(4) a dried precursor was put into a high-temperature furnace, sintered at 1200° C. for 3 hours in a nitrogen atmosphere, and naturally cooled, crushed and screened to obtain a $SiO_x$ composite material with gradient doped of Zn;

(5) the screened sample was evenly mixed with petroleum asphalt according to the mass ratio of 20:1, and the mixture was placed in a high-temperature furnace to be subjected to heat treatment at 900° C. in a nitrogen atmosphere for 2 hours to obtain a carbon-coated $SiO_x$ composite negative electrode with Zn doped in a concentration-gradient manner;

(6) the prepared $SiO_x$ composite material, carbon black (SP) and sodium carboxymethyl cellulose (CMC) were mixed according to the ratio of 7:2:1 to prepare negative electrode slurry, a negative electrode sheet was prepared after coating and drying, a positive electrode material, Lithium cobaltate LCO, was used as a counter electrode, a button cell was assembled in a glove box, and a charge-discharge test was conducted; and battery test results are listed in Table 1.

Embodiment 4

The embodiment provides a negative electrode material with gradient doped Ni.

The preparation process and testing process are as follows.

(1) A nickel chloride solution of 1 mol/L, a sodium hydroxide solution of 2 mol/L and ammonia water of 2 mol/L were prepared first;

(2) $SiO_x$ particles and deionized water were fully stirred and evenly mixed according to the ratio of 1:10 to prepare $SiO_x$ slurry, then the nickel chloride solution was added while stirring, where the mass ratio of the introduced nickel element to the $SiO_x$ was 1:3, after even mixing, the sodium hydroxide solution and the ammonia water were added into a reaction container together, the pH was adjusted to 11, and continuous stirring was conducted for 10 hours, where the reaction temperature in the whole process was 60° C.;

(3) the precipitated slurry was washed and centrifuged many times, and dried in an oven at 80° C. for 12 hours;

(4) a dried precursor was put into a high-temperature furnace, sintered at 1200° C. for 3 hours in a nitrogen atmosphere, and naturally cooled, crushed and screened to obtain a $SiO_x$ composite material with gradient doped Ni;

(5) the screened sample was evenly mixed with petroleum asphalt according to the mass ratio of 20:1, and the mixture was placed in a high-temperature furnace to be subjected to heat treatment at 900° C. in a nitrogen atmosphere for 2 hours to obtain a carbon-coated $SiO_x$ composite negative electrode with Ni doped in a concentration-gradient manner;

(6) the prepared $SiO_x$ composite material, carbon black (SP) and sodium carboxymethyl cellulose (CMC) were mixed according to the ratio of 7:2:1 to prepare negative electrode slurry, a negative electrode sheet was prepared after coating and drying, by using a ternary positive electrode material, NCM 333, a button cell was assembled in a glove box, and a charge-discharge test was conducted; and battery test results are listed in Table 1.

Embodiment 5

The embodiment provides a negative electrode material with gradient doped Ni.

The preparation process and testing process are as follows.

(1) A nickel nitrate solution of 1 mol/L, a sodium hydroxide solution of 2 mol/L and ammonia water of 2 mol/L were prepared first;

(2) $SiO_x$ particles and deionized water were fully stirred and evenly mixed according to the ratio of 1:10 to prepare $SiO_x$ slurry, then the nickel nitrate solution was added while stirring, where the mass ratio of the introduced nickel element to the $SiO_x$ was 1:4, after even mixing, the sodium hydroxide solution and the ammonia water were added into a reaction container together, the pH was adjusted to 11, and continuous stirring was conducted for 10 hours, where the reaction temperature in the whole process was 60° C.;

(3) the precipitated slurry was washed and centrifuged many times, and dried in an oven at 80° C. for 12 hours;

(4) a dried precursor was put into a high-temperature furnace, sintered at 1200° C. for 3 hours in a nitrogen atmosphere, and naturally cooled, crushed and screened to obtain a $SiO_x$ composite material with gradient doped Ni;

(5) the screened sample was evenly mixed with petroleum asphalt according to the mass ratio of 20:1, and the mixture was placed in a high-temperature furnace to be subjected to heat treatment at 900° C. in a nitrogen atmosphere for 2 hours to obtain a carbon-coated $SiO_x$ composite negative electrode with Ni doped in a concentration-gradient manner;

(6) the prepared $SiO_x$ composite material, carbon black (SP) and sodium carboxymethyl cellulose (CMC) were mixed according to the ratio of 7:2:1 to prepare negative electrode slurry, a negative electrode sheet was prepared after coating and drying, by using a ternary positive electrode material, NCM 523, a button cell was assembled in a glove box, and a charge-discharge test was conducted; and battery test results are listed in Table 1.

Embodiment 6

The embodiment provides a negative electrode material with gradient doped Ni.

The preparation process and testing process are as follows.

(1) A diethyl ether solution of nickelocene of 1 mol/L was prepared first;

(2) $SiO_x$ particles and diethyl ether were fully stirred and evenly mixed according to the ratio of 1:10 to prepare $SiO_x$ slurry, then the diethyl ether solution of nickelocene was added while stirring, where the mass ratio of the introduced nickel element to the $SiO_x$ was 1:5, continuous stirring was conducted for 10 hours, and then the slurry was placed in an oven in 80° C. to be baked for 12 hours;

(3) a dried precursor was put into a high-temperature furnace, sintered at 1200° C. for 3 hours in a nitrogen atmosphere, and naturally cooled, crushed and screened to obtain a $SiO_x$ composite material with gradient doped Ni;

(4) the screened sample was evenly mixed with petroleum asphalt according to the mass ratio of 20:1, and the mixture was placed in a high-temperature furnace to be subjected to heat treatment at 900° C. in a nitrogen atmosphere for 2 hours to obtain a carbon-coated $SiO_x$ composite negative electrode with Ni doped in a concentration-gradient manner;

(5) the prepared $SiO_x$ composite material, carbon black (SP) and sodium carboxymethyl cellulose (CMC) were mixed according to the ratio of 7:2:1 to prepare negative electrode slurry, a negative electrode sheet was prepared after coating and drying, a ternary positive electrode material, Lithium nickel cobalt aluminate NCA, was used as a counter electrode, a button cell was assembled in a glove box, and a charge-discharge test was conducted; and battery test results are listed in Table 1.

Embodiment 7

The embodiment provides a negative electrode material with gradient doped Al.

The preparation process and testing process are as follows.

(1) A $Al_2(SO_4)_3$ solution of 1 mol/L and ammonia water of 1 mol/L were prepared first;

(2) $SiO_x$ particles and deionized water were fully stirred and evenly mixed according to the ratio of 1:10 to prepare $SiO_x$ slurry, then the $Al_2(SO_4)_3$ solution was added while stirring, where the mass ratio of the introduced Al element to the $SiO_x$ was 1:3, after even mixing, the ammonia water was added into a reaction container together, the pH was adjusted to 8, and continuous stirring was conducted for 10 hours, where the reaction temperature in the whole process was 60° C.;

(3) the precipitated slurry was washed and centrifuged many times, and dried in an oven at 80° C. for 12 hours;

(4) a dried precursor was put into a high-temperature furnace, sintered at 1200° C. for 3 hours in a nitrogen atmosphere, and naturally cooled, crushed and screened to obtain a $SiO_x$ composite material with gradient doped Al;

(5) the screened sample was evenly mixed with petroleum asphalt according to the mass ratio of 20:1, and the mixture was placed in a high-temperature furnace to be subjected to heat treatment at 900° C. in a nitrogen atmosphere for 2 hours to obtain a carbon-coated $SiO_x$ composite negative electrode with Al doped in a concentration-gradient manner;

(6) the prepared $SiO_x$ composite material, carbon black (SP) and sodium carboxymethyl cellulose (CMC) were mixed according to the ratio of 7:2:1 to prepare negative electrode slurry, a negative electrode sheet was prepared after coating and drying, a positive electrode material, ferrous lithium phosphate (LFP), was used as a counter electrode, a button cell was assembled in a glove box, and a charge-discharge test was conducted; and battery test results are listed in Table 1.

Embodiment 8

The embodiment provides a negative electrode material with gradient doped Na.

The preparation process and testing process are as follows.

(1) A $Na_3C_6H_5O_7 \cdot 2H_2O$ solution of 1 mol/L was prepared first;

(2) $SiO_x$ particles and deionized water were fully stirred and evenly mixed according to the ratio of 1:10 to prepare $SiO_x$ slurry, then the $Na_3C_6H_5O_7 \cdot 2H_2O$ solution was added while stirring, where the mass ratio of the introduced Na element to the $SiO_x$ was 1:4, continuous stirring was conducted for 10 hours, and then the mixture was placed in an oven at 80° C. to be baked for 12 hours;

(3) a dried precursor was placed in a high-temperature furnace and sintered at 1200° C. for 3 hours in a nitrogen atmosphere, and naturally cooled, crushed and screened to obtain a $SiO_x$ composite material with gradient doped Na;

(4) the screened sample was evenly mixed with glucose according to the mass ratio of 20:1, and the mixture was placed in a high-temperature furnace to be subjected to heat treatment at 900° C. in a nitrogen atmosphere for 2 hours to obtain a carbon-coated $SiO_x$ composite negative electrode with Na doped in a concentration-gradient manner;

(5) the prepared $SiO_x$ composite material, carbon black (SP) and sodium carboxymethyl cellulose (CMC) were mixed according to the ratio of 7:2:1 to prepare negative electrode slurry, a negative electrode sheet was prepared after coating and drying, a positive electrode material, lithium manganese oxide (LMO), was used as a counter electrode, a button cell was assembled in a glove box, and a charge-discharge test was conducted; and battery test results are listed in Table 1.

Embodiment 9

The embodiment provides a negative electrode material with gradient doped Al.

The preparation process and testing process are as follows.

(1) An ethyl alcohol solution of aluminum isopropoxide of 1 mol/L was prepared first;

(2) $SiO_x$ particles and ethyl alcohol were fully stirred and evenly mixed according to the ratio of 1:10 to prepare $SiO_x$ slurry, then the ethyl alcohol solution of aluminum isopropoxide was added while stirring, where the mass ratio of the introduced Al element to the $SiO_x$ was 1:5, continuous stirring was conducted for 10 hours, and then the slurry was placed in an oven at 80° C. to be baked for 12 hours;

(3) a dried precursor was put into a high-temperature furnace, sintered at 1200° C. for 3 hours in a nitrogen atmosphere, and naturally cooled, crushed and screened to obtain a $SiO_x$ composite material with gradient doped Al;

(4) the screened sample was evenly mixed with petroleum asphalt according to the mass ratio of 20:1, and the mixture was placed in a high-temperature furnace to be subjected to heat treatment at 900° C. in a nitrogen atmosphere for 2 hours to obtain a carbon-coated $SiO_x$ composite negative electrode with Al doped in a concentration-gradient manner;

(5) the prepared $SiO_x$ composite material, carbon black (SP) and sodium carboxymethyl cellulose (CMC) were mixed according to the ratio of 7:2:1 to prepare negative electrode slurry, a negative electrode sheet was prepared after coating and drying, metal Li was used as a counter electrode, a button cell was assembled in a glove box, and a charge-discharge test was conducted; and battery test results are listed in Table 1.

Embodiment 10

The embodiment provides a negative electrode material with gradient doped Mg.

The preparation process and testing process are as follows.

(1) A magnesium acetate solution of 1 mol/L, a sodium hydroxide solution of 2 mol/L and ammonia water of 2 mol/L were prepared first;

(2) $SiO_x$ particles and deionized water were fully stirred and evenly mixed according to the ratio of 1:10 to prepare $SiO_x$ slurry, then the magnesium acetate solution was added while stirring, where the mass ratio of the introduced magnesium element to the $SiO_x$ was 1:3, after even mixing, the sodium hydroxide solution and the ammonia water were added into a reaction container together, the pH was adjusted to 11, and continuous stirring was conducted for 10 hours, where the reaction temperature in the whole process was 60° C.;

(3) the precipitated slurry was washed and centrifuged many times, and dried in an oven at 80° C. for 12 hours;

(4) a dried precursor was put in vacuum, sintered at 1200° C. for 3 hours in vacuum, and naturally cooled, crushed and screened to obtain a $SiO_x$ composite material with gradient doped Mg;

(5) a screened sample was placed in a rotary furnace, a mixed gas of argon and acetylene with a volume ratio of 3:1 was introduced at 900° C., and the temperature was kept for 2 hours to obtain a carbon-coated $SiO_x$ composite negative electrode with Mg doped in a concentration-gradient manner;

(6) the prepared $SiO_x$ composite material, carbon black (SP) and sodium carboxymethyl cellulose (CMC) were mixed according to the ratio of 7:2:1 to prepare negative electrode slurry, a negative electrode sheet was prepared after coating and drying, by using a ternary positive electrode material, NCM 811, a button cell was assembled in a glove box, and a charge-discharge test was conducted; and battery test results are listed in Table 1.

Embodiment 11

The embodiment provides a negative electrode material with gradient-doped Fe.

The preparation process and testing process are as follows.

(1) An iron acetate solution of 1 mol/L, a sodium hydroxide solution of 2 mol/L and ammonia water of 2 mol/L were prepared first;

(2) $SiO_x$ particles and deionized water were fully stirred and evenly mixed according to the ratio of 1:10 to prepare $SiO_x$ slurry, then the iron acetate solution was added while stirring, where the mass ratio of the introduced Fe to the $SiO_x$ was 1:3, after even mixing, the sodium hydroxide solution and the ammonia water were added into a reaction container together, the pH was adjusted to 11, and continuous stirring was conducted for 10 hours, where the reaction temperature in the whole process was 60° C.;

(3) the precipitated slurry was washed and centrifuged many times, and dried in an oven at 80° C. for 12 hours;

(4) a dried precursor was put in a vacuum furnace, sintered at 1000° C. for 3 hours in vacuum, and naturally cooled, crushed and screened to obtain a $SiO_x$ composite material with gradient doped Fe;

(5) a screened sample was placed in a rotary furnace, a mixed gas of argon and methane with a volume ratio of 3:1 was introduced at 1000° C., and the temperature was kept for 2 hours to obtain a carbon-coated $SiO_x$ composite negative electrode with Fe doped in a concentration-gradient manner;

(6) the prepared $SiO_x$ composite material, carbon black (SP) and sodium carboxymethyl cellulose (CMC) were mixed according to the ratio of 7:2:1 to prepare negative electrode slurry, a negative electrode sheet was prepared after coating and drying, metal Li was used as a counter electrode, a garnet type $Li_7La_3Zr_2O_{12}$ (LLZO) was used as a solid electrolyte, an all-solid button cell was assembled in a glove box, and a charge-discharge test was conducted; and battery test results are listed in Table 1.

Embodiment 12

The embodiment provides a negative electrode material with gradient-doped Co.

The preparation process and testing process are as follows.

(1) A cobalt acetate solution of 1 mol/L, a sodium hydroxide solution of 2 mol/L and ammonia water of 2 mol/L were prepared first;

(2) $SiO_x$ particles and deionized water were fully stirred and evenly mixed according to the ratio of 1:10 to prepare $SiO_x$ slurry, then the cobalt acetate solution was added while stirring, where the mass ratio of the introduced cobalt to the $SiO_x$ was 1:3, after even mixing, the sodium hydroxide solution and the ammonia water were added into a reaction container together, the pH was adjusted to 11, and continuous stirring was conducted for 10 hours, where the reaction temperature in the whole process was 60° C.;

(3) the precipitated slurry was washed and centrifuged many times, and dried in an oven at 80° C. for 12 hours;

(4) a dried precursor was put into a high-temperature furnace, sintered at 1000° C. for 3 hours in an argon atmosphere, and naturally cooled, crushed and screened to obtain a $SiO_x$ composite material with gradient doped Co;

(5) a screened sample was placed in a rotary furnace, a mixed gas of argon and methane with a volume ratio of 3:1 was introduced at 1000° C., and the temperature was kept for 2 hours to obtain a carbon-coated $SiO_x$ composite negative electrode with Co doped in a concentration-gradient manner;

(6) the prepared $SiO_x$ composite material, carbon black (SP) and sodium carboxymethyl cellulose (CMC) were mixed according to the ratio of 7:2:1 to prepare negative electrode slurry, a negative electrode sheet was prepared after coating and drying, metal Li was used as a counter electrode, a polyolefin-based gel polymer electrolyte membrane was used as a semi-solid electrolyte, a semi-solid button cell was assembled in a glove box, and a charge-discharge test was conducted; and battery test results are listed in Table 1.

Embodiment 13

The embodiment provides a negative electrode material featuring gradient doping Co.

The preparation process and testing process are as follows.

(1) A cobalt nitrate solution of 1 mol/L, a sodium hydroxide solution of 2 mol/L and ammonia water of 2 mol/L were prepared first;

(2) $SiO_x$ particles and deionized water were fully stirred and evenly mixed according to the ratio of 1:10 to prepare $SiO_x$ slurry, then the cobalt nitrate solution was added while stirring, where the mass ratio of the introduced cobalt to the $SiO_x$ was 1:3, after even mixing, the sodium hydroxide solution and the ammonia water were added into a reaction container together, the pH was adjusted to 11, and continuous stirring was conducted for 10 hours, where the reaction temperature in the whole process was 60° C.;

(3) the precipitated slurry was washed and centrifuged many times, and dried in an oven at 80° C. for 12 hours;

(4) a dried precursor was put into a high-temperature furnace, sintered at 1000° C. for 3 hours in an argon atmosphere, and naturally cooled, crushed and screened to obtain a $SiO_x$ composite material with gradient doped Co;

(5) a screened sample was placed in a rotary furnace, a mixed gas of argon and methane with a volume ratio of 3:1 was introduced at 1000° C., and the temperature was kept for 2 hours to obtain a carbon-coated $SiO_x$ composite negative electrode with Co doped in a concentration-gradient manner;

(6) the prepared $SiO_x$ composite material and commercial graphite were compounded into a 450 mAh/g composite material, the positive electrode material, Lithium cobaltate (LCO), was used as a counter electrode, a button cell was assembled in a glove box, and a charge-discharge test was conducted; and battery test results are listed in Table 1.

Embodiment 14

The embodiment provides a negative electrode material with gradient doped Li.

The preparation process and testing process are as follows.

(1) a lithium carbonate solution of 1 mol/L was prepared first, and the pH was adjusted to 3 with dilute hydrochloric acid;

(2) $SiO_x$ particles and deionized water were fully stirred and evenly mixed according to the ratio of 1:10 to prepare $SiO_x$ slurry, then the lithium carbonate solution was added while stirring, where the mass ratio of the introduced Li element to the $SiO_x$ was 1:5, continuous stirring was conducted for 10 hours, and then the mixture was placed in an oven at 80° C. to be baked for 12 hours;

(3) a dried precursor was placed in a high-temperature furnace and sintered at 1200° C. for 3 hours in a nitrogen atmosphere, and naturally cooled, crushed and screened to obtain a $SiO_x$ composite material with gradient doped Li;

(4) the screened sample was evenly mixed with petroleum asphalt according to the mass ratio of 20:1, and the mixture was placed in a high-temperature furnace to be subjected to heat treatment at 900° C. in a nitrogen atmosphere for 2 hours to obtain a carbon-coated $SiO_x$ composite negative electrode with Li doped in a concentration-gradient manner;

(5) the prepared $SiO_x$ composite material and commercial graphite were compounded into a 550 mAh/g composite material, metal Li was used as a counter electrode, a button cell was assembled in a glove box, and a charge-discharge test was conducted; and battery test results are listed in Table 1.

Embodiment 15

The embodiment provides a negative electrode material with gradient doped Cu.

The preparation process and testing process are as follows.

(1) A $CuSO_4$ solution of 1 mol/L and ammonia water of 1 mol/L were prepared first;

(2) $SiO_x$ particles and deionized water were fully stirred and evenly mixed according to the ratio of 1:10 to prepare $SiO_x$ slurry, then the $CuSO_4$ solution was added while stirring, where the mass ratio of the introduced Cu element to the $SiO_x$ was 1:5, after even mixing, the ammonia water was added into a reaction container together, the pH was adjusted to 8, and continuous stirring was conducted for 10 hours, where the reaction temperature in the whole process was 60° C.;

(3) the precipitated slurry was washed and centrifuged many times, and dried in an oven at 80° C. for 12 hours;

(4) a dried precursor was put into a high-temperature furnace, sintered at 1200° C. for 3 hours in a nitrogen atmosphere, and naturally cooled, crushed and screened to obtain a $SiO_x$ composite material with gradient doped Cu;

(5) the screened sample was evenly mixed with petroleum asphalt according to the mass ratio of 20:1, and the mixture was placed in a high-temperature furnace to be subjected to heat treatment at 900° C. in a nitrogen atmosphere for 2 hours to obtain a carbon-coated $SiO_x$ composite negative electrode with Cu doped in a concentration-gradient manner;

(6) the prepared $SiO_x$ composite material and commercial graphite were compounded into a 550 mAh/g composite material, metal Li was used as a counter electrode, a button cell was assembled in a glove box, and a charge-discharge test was conducted; and battery test results are listed in Table 1.

Embodiment 16

The embodiment provides a negative electrode material with gradient doped Mn.

The preparation process and testing process are as follows.

(1) A $Mn(CH_3COO)_2$ solution of 1 mol/L and ammonia water of 1 mol/L were prepared first;

(2) $SiO_x$ particles and deionized water were fully stirred and evenly mixed according to the ratio of 1:10 to prepare $SiO_x$ slurry, then the $Mn(CH_3COO)_2$ solution was added while stirring, where the mass ratio of the introduced Mn element to the $SiO_x$ was 1:5, after even mixing, the ammonia water was added into a reaction container together, the pH was adjusted to 8, and continuous stirring was conducted for 10 hours, where the reaction temperature in the whole process was 60° C.;

(3) the precipitated slurry was washed and centrifuged many times, and dried in an oven at 80° C. for 12 hours;

(4) a dried precursor was put into a high-temperature furnace, sintered at 1200° C. for 3 hours in a nitrogen atmosphere, and naturally cooled, crushed and screened to obtain a $SiO_x$ composite material with gradient doped Mn;

(5) the screened sample was evenly mixed with petroleum asphalt according to the mass ratio of 20:1, and the mixture was placed in a high-temperature furnace to be subjected to heat treatment at 900° C. in a nitrogen atmosphere for 2 hours to obtain a carbon-coated $SiO_x$ composite negative electrode with Mn doped in a concentration-gradient manner;

(6) the prepared $SiO_x$ composite material and commercial graphite were compounded into a 550 mAh/g composite material, metal Li was used as a counter electrode, a button cell was assembled in a glove box, and a charge-discharge test was conducted; and battery test results are listed in Table 1.

Comparative Example 1

The comparative example provides a negative electrode material featuring uniform doping of Zn.

The preparation process and testing process are as follows.

(1) metal Zn and $SiO_x$ were evenly mixed according to the ratio of 1:3, and put in a crucible of a vacuum reaction furnace; after vacuumizing to 10 Pa, the temperature was gradually raised to 1200° C. and kept for 3 hours; in the vacuum environment, the metal Zn and $SiO_x$ volatilized successively into zinc vapor and $SiO_x$ vapor, and the two kinds of vapor met and deposited on a cooling plate in the vacuum reaction furnace; and a discharged material was crushed and screened to obtain a $SiO_x$ composite material featuring uniform doping of Zn;

(2) the screened sample was evenly mixed with petroleum asphalt according to the mass ratio of 20:1, and the mixture was placed in a high-temperature furnace to be subjected to heat treatment at 900° C. in a nitrogen atmosphere for 2 hours to obtain a carbon-coated $SiO_x$ composite negative electrode with uniform doped Zn; and (3) the prepared $SiO_x$ composite material, carbon black (SP) and sodium carboxymethyl cellulose (CMC) were mixed according to the ratio of 7:2:1 to prepare negative electrode slurry, a negative electrode sheet was prepared after coating and drying, metal Li was used as a counter electrode, a button cell was assembled in a glove box, and a charge-discharge test was conducted; and battery test results are listed in Table 1.

TABLE 1

| No. | First-cycle gram volume (mAh/g) | First-cycle efficiency | 50-cycle capacity retention rate |
|---|---|---|---|
| 1 | 1404 | 80.5% | 68% |
| 2 | 1350 | 81.7% | 72% |
| 3 | 1292 | 83.1% | 75% |
| 4 | 1390 | 79.3% | 68% |
| 5 | 1309 | 79.9% | 75% |
| 6 | 1277 | 81.5% | 76% |
| 7 | 1403 | 78.9% | 70% |
| 8 | 1364 | 81.4% | 72% |
| 9 | 1307 | 82.5% | 74% |
| 10 | 1398 | 80.7% | 69% |
| 11 | 1275 | 79.6% | 68% |
| 12 | 1306 | 80.3% | 70% |
| 13 | 451 | 90.7% | 87% |
| 14 | 549 | 89.2% | 82% |
| 15 | 552 | 88.3% | 81% |
| 16 | 551 | 87.5% | 81% |
| Comparative example 1 | 1387 | 80.9% | 58% |

As shown in Table 1, for particles with concentration-gradient doped in the above embodiments, with the increase of doping amount, the gram volume of $SiO_x$ decreases, but the first-cycle efficiency, especially the cycling performance is obviously improved. By comparing Embodiment 1 with Comparative Example 1, it can be seen that under the same total doping amount, there is little difference in the first-cycle gram volume and the first-cycle efficiency, but the material cycling performance (50-cycle capacity retention rate) of Embodiment 1 featuring concentration-gradient doping is obviously better. During lithium intercalation of $SiO_x$, the whole particle expands. Besides its own expansion stress, an outer shell of the particle also bears the pressure caused by expansion inside the particle, so as to bear greater stress than an inner position. The high outside and low inside gradient doping method can better adapt to the increasing stress of the particle from inside to outside, and has an obvious effect on alleviating volume expansion, so as to improve the cycling performance.

The above-mentioned specific embodiments further explain the purpose, technical scheme and beneficial effects of the present invention in detail. It should be understood that the above are only specific embodiments of the present invention and are not used to limit the scope of protection of the present invention. Any modification, equivalent substitution, improvement, etc., made within the spirit and principles of the disclosure should be included in the scope of protection of the disclosure.

What is claimed is:

1. A negative electrode material on which a metal element is gradient-doped, the negative electrode material comprising:

a granular silicon oxide/M composite material on which a metal element M is gradient-doped, wherein:

a general formula of the silicon oxide is SiOx, wherein $0<x<2$;

the metal element M comprises one or more of Na, Mg, Al, Li, Mn, Fe, Co, Ni, Cu or Zn;

in the negative electrode material, a content of the metal element M gradually decreases from a surface to a core, showing a continuous doping distribution of concentration gradient;

the average doping mass of the metal element M in the negative electrode material accounts for 5-40% of the total mass of the negative electrode material, and the content of the metal element M decreases continuously from 30-50% on the surface to 0-20% at the core in a gradient manner;

wherein a doping region of the metal element M is a region that starts at a radial position within 0-20% of the particle radius and extends continuously to 100% of the particle radius, and the doping depth is controlled by diffusion of the metal element during high-temperature solid-state treatment depending on diffusion temperature, diffusion time, particle size, and concentration gradient of the doping source; and a general chemical formula of the silicon oxide/M composite material is $SiM_yO_z$, wherein $0<y<10$, $0<z<10$.

2. The negative electrode material on which the metal element is gradient-doped of claim 1, wherein an average particle diameter ($D_{50}$) of the negative electrode material is 0.1 μm-40 μm, and a particle specific surface area of the negative electrode material is 1-40 $m^2/g$.

3. The negative electrode material on which the metal element is gradient-doped of claim 1, wherein the negative electrode material further comprises a carbonaceous coating layer coated on outer surfaces of the silicon oxide/M composite material.

4. A negative electrode sheet, wherein the negative electrode sheet comprises the negative electrode material of claim 1.

5. A lithium battery, wherein the lithium battery comprises the negative electrode material of claim 1.

6. The lithium battery of claim 5, wherein the lithium battery is a liquid lithium ion battery, a semi-solid lithium ion battery, an all-solid ion battery or a lithium-sulfur battery.

* * * * *